(12) United States Patent
Kihara et al.

(10) Patent No.: US 8,491,062 B2
(45) Date of Patent: Jul. 23, 2013

(54) VEHICLE WHEEL

(75) Inventors: Yuji Kihara, Ayase (JP); Yoshinobu Sakashita, Ayase (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 13/099,402

(22) Filed: May 3, 2011

(65) Prior Publication Data

US 2011/0210603 A1 Sep. 1, 2011

Related U.S. Application Data

(63) Continuation of application No. PCT/JP2009/068890, filed on Nov. 5, 2009.

(30) Foreign Application Priority Data

| Nov. 6, 2008 | (JP) | ................................ | 2008-285398 |
| Nov. 5, 2009 | (JP) | ................................ | 2009-253740 |

(51) Int. Cl.
*B60B 3/10* (2006.01)

(52) U.S. Cl.
USPC ............. 301/63.101; 301/64.101; 301/64.704

(58) Field of Classification Search
USPC 301/63.101, 63.103–63.104, 63.107–63.108, 301/64.101, 64.704
See application file for complete search history.

(56) References Cited

U.S. PATENT DOCUMENTS

| 4,610,482 A | * | 9/1986 | Overbeck et al. | ........ | 301/63.105 |
| 2003/0020321 A1 | | 1/2003 | Fitz | | |
| 2003/0080605 A1 | | 5/2003 | Coleman | | |
| 2003/0080606 A1 | | 5/2003 | Coleman | | |
| 2003/0080607 A1 | | 5/2003 | Coleman | | |
| 2003/0080608 A1 | | 5/2003 | Coleman | | |
| 2004/0227392 A1 | | 11/2004 | Coleman et al. | | |
| 2005/0006945 A1 | * | 1/2005 | Alff et al. | ................. | 301/63.108 |
| 2005/0017570 A1 | | 1/2005 | Alff | | |
| 2005/0017571 A1 | | 1/2005 | McCorry | | |
| 2006/0197371 A1 | * | 9/2006 | Coleman et al. | ......... | 301/63.101 |
| 2007/0222279 A1 | * | 9/2007 | Csapo et al. | ............. | 301/64.101 |
| 2012/0074764 A1 | * | 3/2012 | McCorry et al. | ......... | 301/64.101 |

FOREIGN PATENT DOCUMENTS

| JP | 10-211801 | 8/1998 |
| JP | 2004-536739 | 12/2004 |
| JP | 2005-035330 | 2/2005 |
| JP | 2005-507334 | 3/2005 |

(Continued)

OTHER PUBLICATIONS

PCT/JP2009/068890 International Search Report issued Feb. 2, 2010.

(Continued)

*Primary Examiner* — Jason Bellinger
(74) *Attorney, Agent, or Firm* — DLA Piper LLP (US)

(57) ABSTRACT

The technology provides vehicle wheels that can include a hub coupling portion and a spoke. The spoke can have a waved portion at a portion of the spoke in the radial direction of the wheel and can be decreased in section modulus at a cross section of the portion of the spoke taken along a plane perpendicular to the radial direction of the wheel. The waved portion can be formed by displacing the spoke bottom wall and/or the spoke reinforcing walls in the axial direction of the wheel.

7 Claims, 7 Drawing Sheets

FOREIGN PATENT DOCUMENTS

| | | |
|---|---|---|
| JP | 2005-509552 | 4/2005 |
| JP | 2005-511371 | 4/2005 |
| JP | 2006-347476 | 12/2006 |
| WO | WO 03/037651 | 5/2003 |
| WO | WO 2007/146260 | 12/2007 |

OTHER PUBLICATIONS

English Language Abstract of JP 2005-509552 Published Apr. 14, 2005.

English Language Translation of JP 2005-509552 Published Apr. 14, 2005.

English Language Abstract of JP 2005-511371 Published Apr. 28, 2005.

English Language Translation of JP 2005-511371 Published Apr. 28, 2005.

English Language Abstract of JP 2005-035330 Published Feb. 10, 2005.

English Language Translation of JP 2005-035330 Published Feb. 10, 2005.

English Language Abstract of JP 10-211801 published Aug. 11, 2008.

English Language Translation of JP 10-211801 published Aug. 11, 2008.

English Language Abstract of JP 2006-347476 published Dec. 28, 2006.

English Language Translation of JP 2006-347476 published Dec. 28, 2006.

English Language Abstract of JP 2005-507334 published Mar. 17, 2005.

English Language Translation of JP 2005-507334 published Mar. 17, 2005.

English Language Abstract of JP 2004-536739 published Dec. 9, 2004.

English Language Translation of JP 2004-536739 published Dec. 9, 2004.

International Preliminary Report on Patentability issued in PCT/JP2009/068890 on Jun. 16, 2011.

* cited by examiner

VEHICLE WHEEL

RELATED APPLICATIONS

This is a continuation of PCT/JP2009/068890, filed on Nov. 5, 2009, which claims priority to Japanese Patent Application No. 2008-285398, filed on Nov. 6, 2008, and Japanese Patent Application No. 2009-253740, filed on Nov. 5, 2009, the disclosures of which are hereby incorporated by reference in their entirety.

TECHNICAL FIELD

The present technology relates to vehicle wheels.

BACKGROUND

U.S. Patent Publication No. 2006/0197371 discloses a vehicle wheel having a rib (a protrusion) provided radially inside a vent window located circumferentially between adjacent spokes and circumferentially between adjacent hub bolt holes. The rib has a straight outer surface which extends at an angle with respect to the fabricated wheel disk axis throughout an entire length thereof.

BRIEF SUMMARY

The present technology provides vehicle wheels.

In one aspect, a vehicle wheel includes a disk press-formed from a plate. The disk includes a hub coupling portion, a plurality of spokes each extending outwardly in a radial direction of a wheel from the hub coupling portion, a vent window located between adjacent spokes, and a radially outer disk located at a radially outer ends of the wheel and connecting radially outer ends of the adjacent spokes along a circumferential direction of the wheel. Each of the spokes includes a spoke bottom wall having a width extending along the circumferential direction of the wheel and a pair of spoke side walls rising from opposite circumferential ends of the spoke bottom wall in an axial direction of the wheel. Each of the spokes is located outside the hub coupling portion and the radially outer disk in the axial direction of the wheel. Each of the spokes includes a waved portion located at only a portion of each of the spokes in the radial direction of the wheel, the waved portion extending in a direction perpendicular to the radial direction of the wheel at each of the spokes and decreasing a bending rigidity of each of the spokes in the radial direction of the wheel by decreasing a height of each of the pair of spoke side walls in the axial direction of the wheel.

BRIEF DESCRIPTION OF THE DRAWINGS

Specific examples have been chosen for purposes of illustration and description, and are shown in the accompanying drawings, forming a part of the specification.

DETAILED DESCRIPTION OF THE PREFERRED EMBODIMENTS

Vehicle wheels according to embodiments of the present technology will be explained below with reference to FIGS. 1-18.

Figure 2:
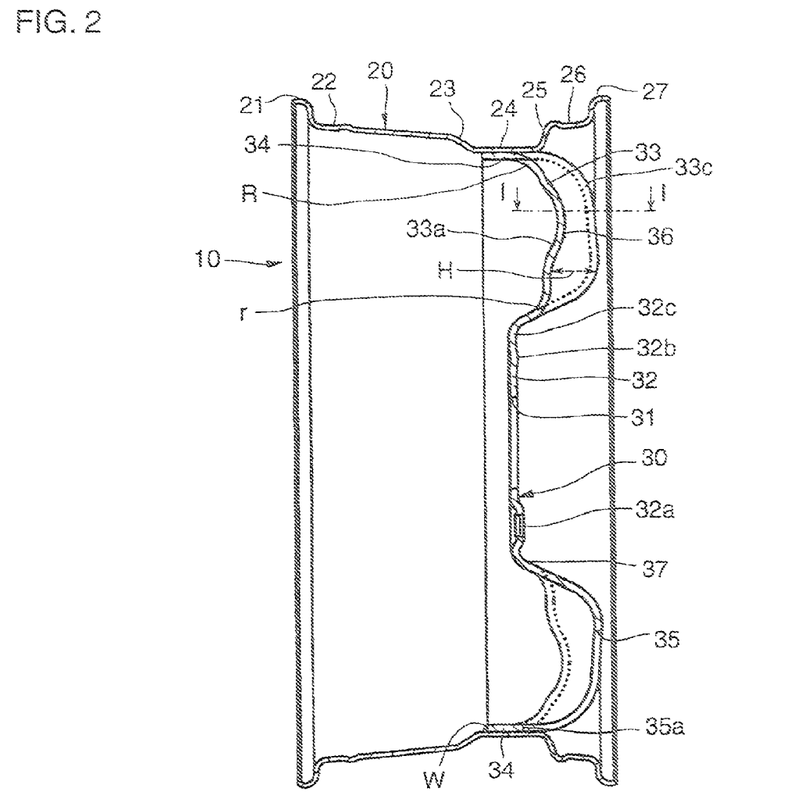
FIG. 2 is a cross-sectional view of a vehicle wheel according to an embodiment of the present technology.

As illustrated in FIG. 2, a vehicle wheel (which may be referred to as a wheel, hereinafter) according to an embodiment of the present technology can include a rim 20 and a disk 30 formed from a plate. The wheel 10 may be made from steel. So long as the wheel 10 includes a disk 30 stamped (press-formed) from a plate, the wheel 10 may be made from materials other than steel, and may be made from aluminum alloy or titanium alloy, etc. The wheel 10 can be a two-piece wheel where the rim 20 and the disk 30 are manufactured independently of each other and are integrated with each other by welding or using a connecting member such as rivets (not shown).

As illustrated in FIG. 2, the rim 20 can include an inboard flange portion 21, an inboard bead seat portion 22, an inboard side wall portion 23, a drop portion 24, an outboard side wall portion 25, an outboard bead seat portion 26 and an outboard flange portion 27. The inboard flange portion 21, the inboard bead seat portion 22 and the inboard side wall portion 23 can be located closer to an inside of a vehicle than the outboard side wall portion 25, the outboard bead seat portion 26 and the outboard flange portion 27 in an axial direction of the wheel when the wheel 10 is mounted to the vehicle.

Figure 15:
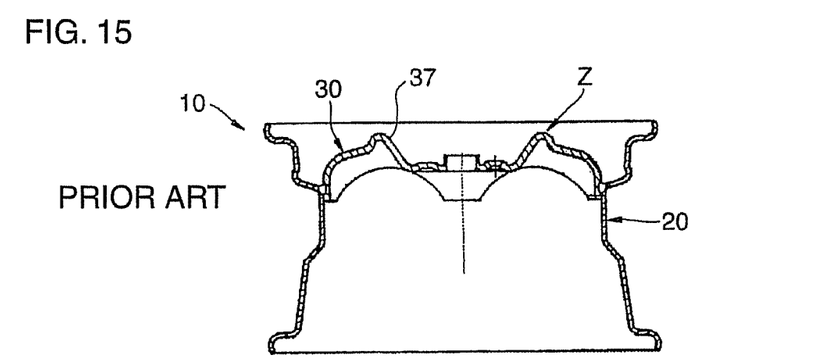
FIG. 15 is a cross-sectional view of an ordinary vehicle wheel disk different from the present technology.
Figure 16:
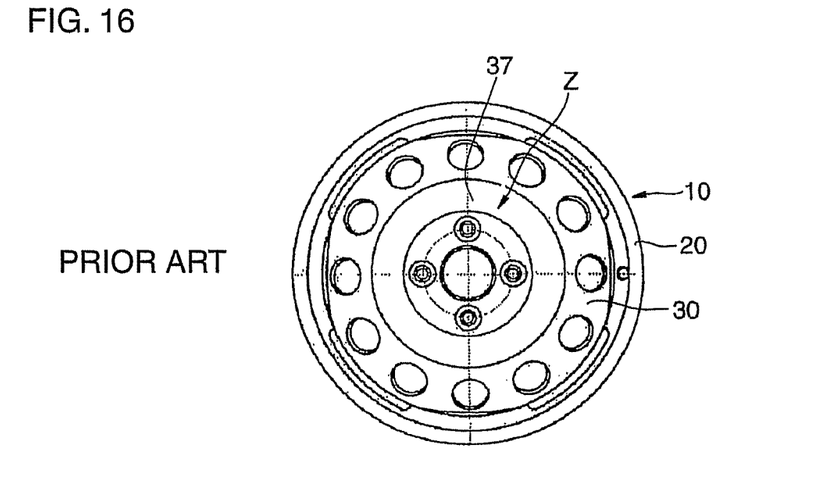
FIG. 16 is a front view of an ordinary vehicle wheel disk different from the present technology.

The disk 30 can include a hub hole 31, a huh coupling portion 32, a spoke 33, a radially outer disk 34, a vent window 35, a waved portion 36 and an inclined portion 37. The disk 30 can not include an annular protrusion Z which is continuous in a circumferential direction of the wheel and protrudes outwardly in an axial direction of the wheel, at a radially outer portion of the inclined portion 37, though the annular protrusion Z is provided in the conventional vehicle wheel disk as shown in FIGS. 15 and 16.

Figure 1:
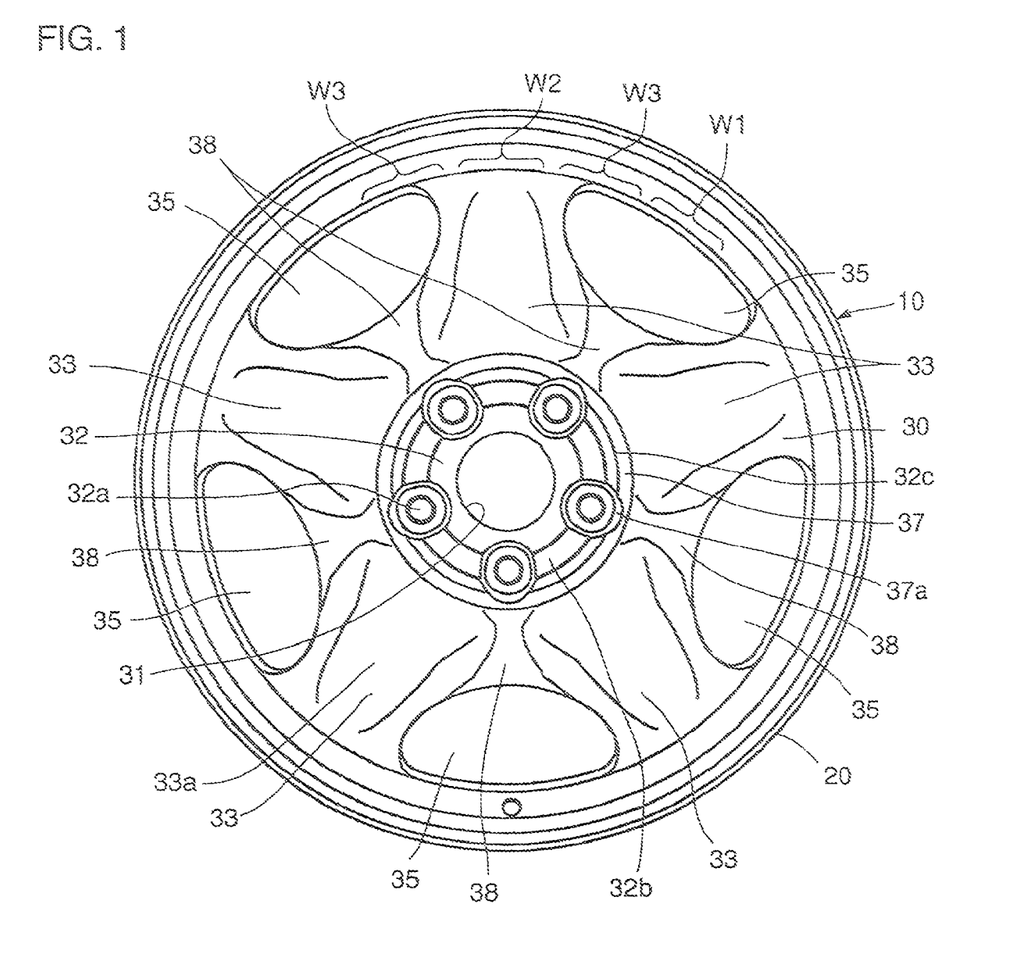
FIG. 1 is a front view of a vehicle wheel according to an embodiment of the present technology.

As illustrated in FIG. 1, the hub hole 31 can be located at a radially central portion of the wheel disk 30. The hub coupling portion 32 can surround the huh hole 31. The huh coupling portion 32 can be in the form of a flat plate or a substantially flat plate and can be perpendicular to a wheel axial direction (to an axis of the wheel disk 30). A plurality of huh bolt holes 32a can be provided at the hub coupling portion 32. The huh bolt holes 32a can be equally spaced along a circumferential direction of the wheel. In one embodiment, five hub bolt holes 32a are provided. The number of the hub bolt holes 32a may vary in different embodiments of the technology, including but not limited to three, four, six or more hub bolt holes. By passing huh bolts (not shown) extending from a hub (not shown) through the hub bolt holes 32a and coupling huh nuts (not shown) with the huh bolts, the disk wheel 30 (the wheel 10) can be fixed to the hub.

As illustrated in FIGS. 1 and 2, an arch band 32b and a swell, or sub-rib 37a, can be provided at the hub coupling portion 32, which may improve rigidity and durability of the huh coupling portion 32. The arch band 32b can connect the hub bolt holes 32a, can be discontinuously annular, and can convexly swell axially outwardly. The extent of the swell can be small, including but not limited to being from about 0.3 mm to about 5 mm. The swell, or sub-rib 37a, can extend between the inclined portion 37 a spoke bottom wall 33a and the hub bolt hole 32a and can swell axially outwardly.

As illustrated in FIG. 1, a radially outer portion 32c of the hub coupling portion 32 (a boundary between the hub coupling portion 32 and the inclined portion 37) can define a circle broken by the sub-rib 37a. A connecting wall 38, which is described in more detail below, does not extend more inwardly than the outermost diameter of the hub coupling portion 32 in the radial direction of the wheel.

Figure 18:
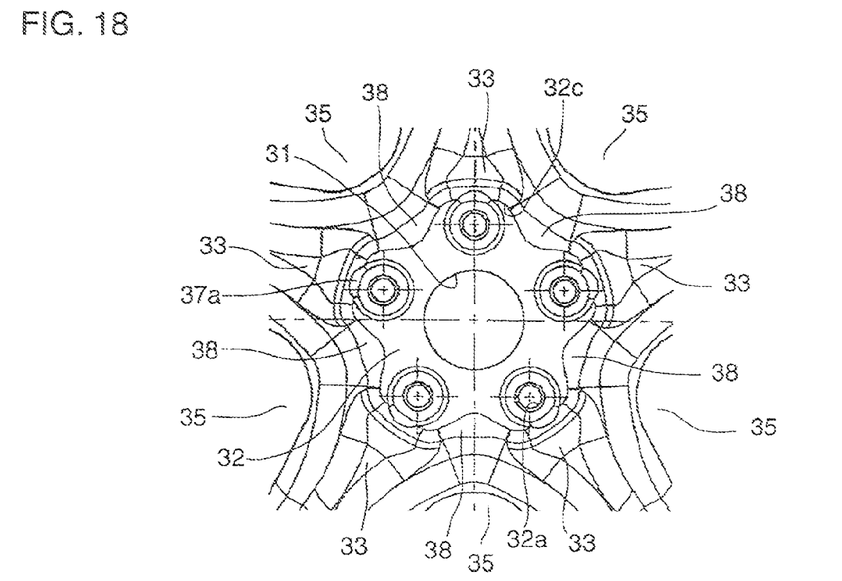
FIG. 18 is a front view of a portion of a disk of a vehicle wheel according to an embodiment of the present technology where a connecting wall connecting a pair of spokes located on opposite sides of a vent window in a circumferential direction of the wheel extends more inwardly than an outermost diameter of a hub coupling portion in a radial direction of the wheel.

In another embodiment of the present technology, as illustrated in FIG. 18, a connecting wall 38 may extend more inwardly than the outermost diameter of the hub coupling portion 32 in the radial direction of the wheel, and a radially outer portion 32c of the huh coupling portion 32 (a boundary between the huh coupling portion 32 and the inclined portion 37) may not define a circle broken by the sub-rib 37a.

As illustrated in FIG. 2, an axially inner surface of the huh coupling portion 32 can be positioned between an axially outer portion and an axially inner portion of the radially outer disk 34 in the axial direction of the wheel.

As illustrated in FIG. 1, the spoke 33 (a radially outer end of the disk) extends radially outwardly from the inclined portion 37 to the radially outer disk 34. A plurality of spokes 33 are illustrated. The illustrated spokes 33 are equally spaced along a circumferential direction of the wheel. In one embodiment, five spokes 33 are provided. The number of the spokes 33 may vary in different embodiments of the technology, including but not limited to having three, four, or six or more spokes provided.

As illustrated in FIG. 2, a radially outer end of the spoke 33 can form a radially outer curved connecting portion R which is bent axially inwardly and is connected to the radially outer disk 34. A radially inner end of the spoke 33 (a radially inner end of the disk) can form a radially inner curved connecting portion r which is bent axially inwardly and is connected to the inclined portion 37. A radially intermediate portion of the spoke 33 (between the radially outer curved connecting portion R and the radially inner curved connecting portion r) can extend in a direction perpendicular or substantially perpendicular to the axial direction of the wheel. Radially opposite ends of the radially intermediate portion of the spoke 33 can be located at substantially equal axial positions in the wheel axial direction.

Figure 17:
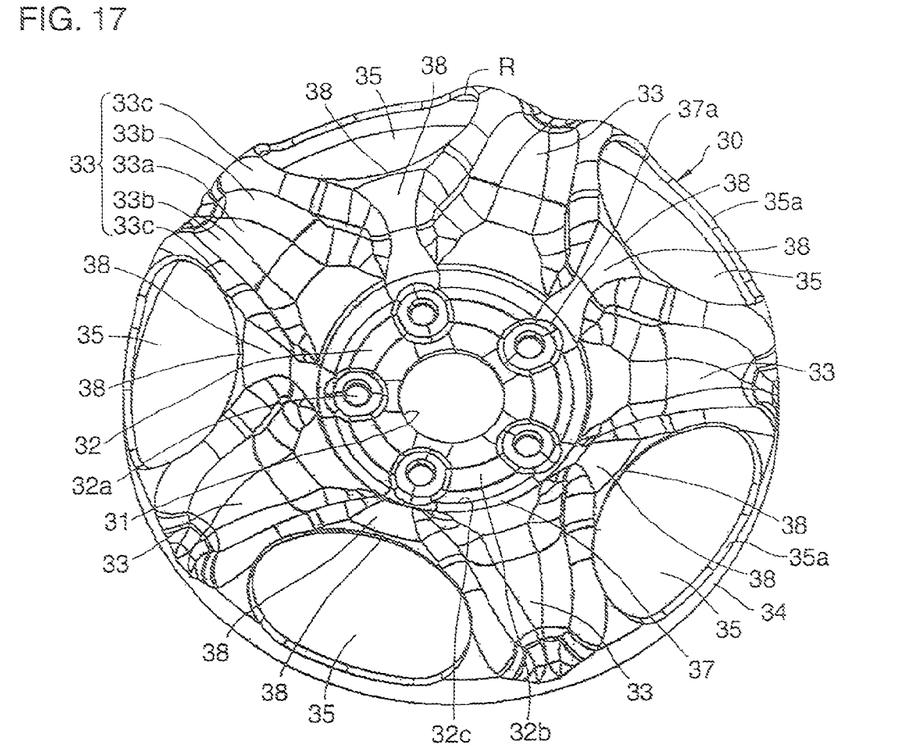
FIG. 17 is an oblique view of a disk of a vehicle wheel according to an embodiment of the present technology showing its curved surface by skeleton lines.

In examples where the radially intermediate portion of the spoke 33 extends in the direction perpendicular to the axial direction of the wheel, when a transverse load acts on a tire (the rim 20) during running of a vehicle, a large bending moment acts on the spoke 33. In order to suppress a deformation of the spoke 33 due to the large bending moment and to increase a durability of the wheel, the spoke 33 can have the spoke bottom wall 33a, spoke side portions 33b and spoke reinforcing wall 33c as shown in FIGS. 17, 13 and 14.

The spoke bottom wall 33a can extend radially outwardly from the inclined portion 37. The spoke bottom wall 33a can also extend in the circumferential direction of the wheel (in a width direction of the spoke 33) in a cross section taken along a plane perpendicular to the radial direction of the wheel.

The spoke side wall 33b can extend (rise) from circumferentially opposite ends of the spoke bottom wall 33a in a direction away from the spoke bottom wall 33a and in the axial direction of the wheel. The spoke side wall 33b may extend from the spoke bottom wall 33a axially outwardly as illustrated in FIG. 13 or may extend from the spoke bottom wall 13a axially inwardly as illustrated in FIG. 14. In FIGS. 13 and 14, "D" shows the axially outward direction of the wheel. In the embodiments of the technology and drawings, the case where the spoke side wall 33b extends from the spoke bottom wall 33a in the axially outward direction of the wheel will be explained, unless otherwise noted.

Figure 13:
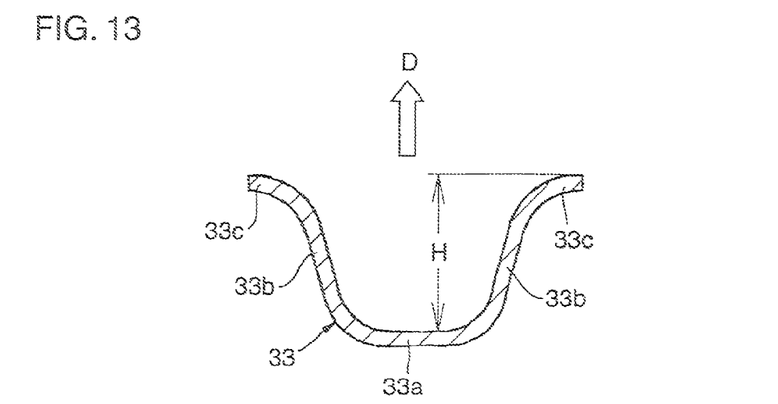
FIG. 13 is a cross-sectional view of a spoke of a disk of a vehicle wheel according to an embodiment of the present technology taken along a plane perpendicular to a radial direction of the wheel where a spoke side wall extends outwardly in an axial direction of the wheel from a spoke bottom wall.
Figure 14:
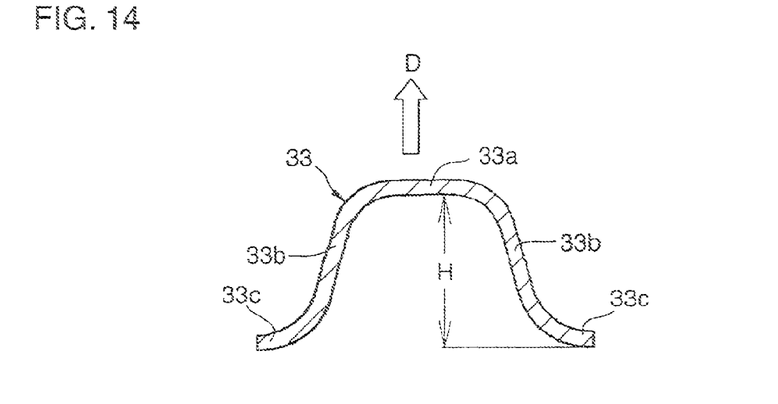
FIG. 14 is a cross-sectional view of a spoke of a disk of a vehicle wheel according to an embodiment of the present technology taken along a plane perpendicular to a radial direction of the wheel where a spoke side wall extends inwardly in an axial direction of the wheel from a spoke bottom wall.

In the embodiment illustrated in FIGS. 13 and 14, the spoke reinforcing wall 33c extends from an end of the spoke side wall 33h opposite the spoke bottom wall 33a in the wheel axial direction and curves from the wheel axial direction to the wheel circumferential direction. Then, the spoke reinforcing wall 33c also extends in the wheel circumferential direction so as to enlarge the circumferential width of the spoke 33.

As illustrated in FIG. 2, the spoke 33 is located axially more outwardly than the hub coupling portion 32 and the radially outer disk 34. As a result, when the wheel 10 is subjected to a load (for example when mounted on a vehicle), a bending moment directed axially inwardly acts on a spoke 33 located on a ground side.

In a case where the spoke side wall 33b extends outwardly in the axial direction of the wheel from the spoke bottom wall 33a, a tension stress is caused at the spoke reinforcing wall 33c in the radial direction of the wheel and supports the load. This may ensure a rigidity of the disk. In a case where the spoke side wall 33h extends inwardly in the axial direction of the wheel from the spoke bottom wall 33a, a compression stress can be caused at the spoke reinforcing wall 33c in the radial direction of the wheel. As a result, a portion of the spoke 33 located at a boundary to the vent window 35 is not liable to be affected by small notches caused when punching the vent window, so that a durability of the wheel may be improved.

An axial width H of the spoke side wall 33b including the spoke reinforcing wall 33c can be greatest at a vicinity of a radially inner end of the vent window 35 as illustrated in FIG. 2 in order that rigidity of the wheel 10 may be effectively increased. The maximum of the axial width H of the spoke side wall 33b including the spoke reinforcing wall 33c can be two to twenty times the thickness of the spoke bottom wall 33a. In some embodiments of the technology, the maximum of the axial width H of the spoke side wall 33b including the spoke reinforcing wall 33c can be four to ten times the thickness of the spoke bottom wall 33a. This may yield a high rigidity of the wheel 10 and a good formability of the wheel disk 30.

Though the axial width H of the spoke side wall 33b including the spoke reinforcing wall 33c gradually decreases in a radially outward direction away from the maximum width portion in the embodiment shown in FIG. 2, the axial width H may alternatively partially increase.

As illustrated in FIG. 1, the vent window 35 can be located between circumferentially adjacent spokes 33. The width of the spoke 33 along the wheel circumferential direction can be smallest at a portion corresponding to a portion of the vent windows 35 having a greatest interior length along the wheel circumferential direction.

As illustrated in FIGS. 2 and 17, the radially outer disk 34 can be located at or near a radially outer end of the wheel disk 30. The radially outer disk 34 can be formed in the shape of a ring and connects radially outer ends of the spokes 33 in the circumferential direction of the wheel. The radially outer disk 34 can be cylindrical and can have a constant or a substantially constant diameter over its entire axial length.

In the embodiment illustrated in FIG. 2, the radially outer disk 34 is fit to the rim 20 at the drop portion 24 of the rim 20 and is fixed to the rim 20 by welding or other means. In some embodiments of the technology, the radially outer disk 34 may alternatively be fit to the rim 20 at the inboard bead seat portion 22 or the outboard bead seat portion 26.

In some embodiments of the technology, the radially outer disk 34 may be fixed to the rim 20 at a position W1 (shown in FIG. 1) only, where W1 is defined as a circumferential position extending circumferentially along an axially inner end of a portion of the radially outer disk 34 located adjacent to the vent window 35.

The radially outer disk 34 may be fixed to the rim 20 at a position W2 (shown in FIG. 1) only, where W2 is defined as a circumferential position extending circumferentially along an axially inner end of a portion of the radially outer disk 34 located adjacent to a radially outer end of the spoke 33.

The radially outer disk 34 may be fixed to the rim 20 at a position W3 (shown in FIG. 1) only, where W3 is defined as a circumferential position extending circumferentially along an axially inner end of a portion of the radially outer disk 34 located adjacent to a disk between the vent window 35 and the radially outer end of the spoke 33.

The radially outer disk 34 may alternatively be fixed to the rim 20 at any two positions selected from the circumferential positions W1, W2 and W3 (at W1 and W2, or at W1 and W3, or at W2 and W3). The radially outer disk 34 may alternatively be fixed to the rim 20 at all of the circumferential positions W1, W2 and W3.

When the radially outer disk 34 is fixed to the rim 20 at the position W1 only, stress concentration on the weld may be reduced, and a fatigue durability of the wheel 10 may be increased, because the rigidity at the position W1 may be less than that at the position W2.

When the radially outer disk 34 is fixed to the rim 20 at the position W2 only, a load from the rim 20 can be surely transmitted to the hub coupling portion 32 through the spoke 33.

When the radially outer disk 34 is fixed to the rim 20 at the position W3 only, welding can be surely conducted, because an axial position of the position W3 after press-forming may be stable, even if the vent window 35 is punched before the radially outer disk 34 is press-formed.

Figure 11:
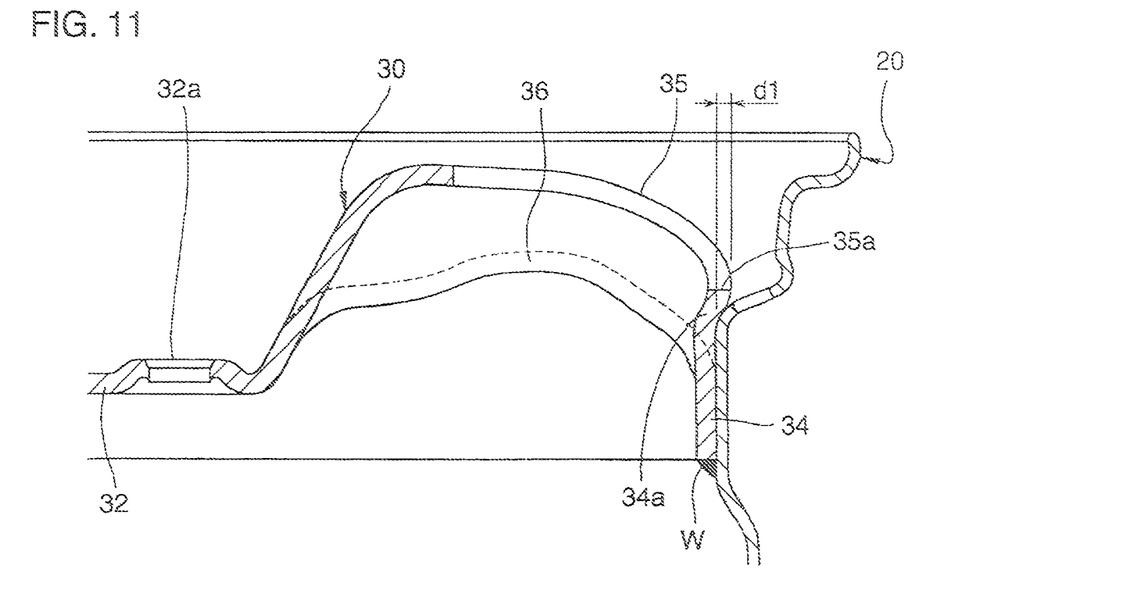
FIG. 11 is a cross-sectional view of a portion of a vehicle wheel according to an embodiment of the present technology where a shift portion having the shape of a step is provided between a vent window and a radially outer disk.
Figure 12:
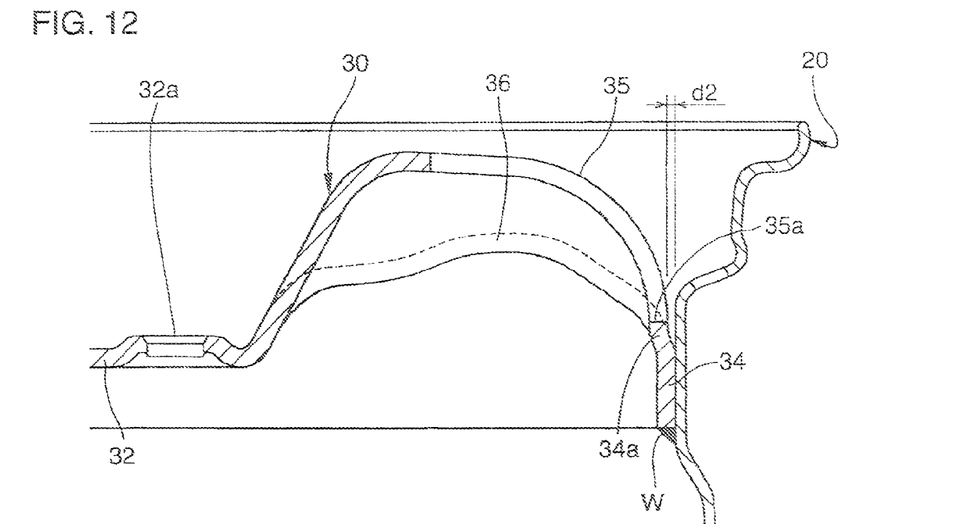
FIG. 12 is a cross-sectional view of a portion of a vehicle wheel according to an embodiment of the present technology where a shift portion having the shape of a step is provided between a vent window and a radially outer disk.

When the radially outer disk 34 is fixed to the rim 20 by welding, the weld W may be axially positioned at the axially inner end of the radially outer disk 34 (as shown in FIGS. 2, 11 and 12), or at the axially outer end of the radially outer disk 34 (not shown), or at both of the axially inner and outer ends of the radially outer disk 34.

illustrated in FIG. 1, the vent window 35 can be located between adjacent spokes 33 in the circumferential direction of the wheel. The vent windows 35 can be equally spaced along the circumferential direction of the wheel. The same number of vent windows 35 as that of the spokes 33 can be provided. A radially outer end 35a of the vent window 35 defines an axially innermost portion of the vent window 35. In FIGS. 2 and 17, the radially outer end 35a of the vent window 35 reaches the radially outer disk 34 and is directly connected to the radially outer disk 34. However, as illustrated in FIGS. 11 and 12, a tapered or stepped shift portion 34a may be provided between the vent window 35 and the radially outer disk 34.

In the embodiment illustrated in FIG. 11, the shift portion 34a is stepped. A diameter of a portion of the shift portion 34a closer to the vent window portion 35 is larger than a diameter of a portion of the shift portion 34a closer to the radially outer disk 34. The radially outer end 35a of the vent window 35 is located radially outside a radially outer surface of the radially outer disk 34. In some embodiments of the technology, a difference in radius (a step amount) d1 between the radially outer surface of the radially outer disk 34 and a radially outer surface of the shift portion 34a is smaller than a thickness of the radially outer disk 34, and can be for example, about 5 mm, or from about 2.5 mm to about 8 mm. In some embodiments of the technology, the step amount d1 can be about 0.5 mm or larger and equal to or smaller than the thickness of the radially outer disk 34. When the step amount d1 is equal to about 0.5 mm or larger and equal to or smaller than the thickness of the radially outer disk 34, a rigidity of the radially outer disk 34 may be high and the durability of the wheel 10 may be high.

Further, positioning the wheel disk 30 relative to the rim 20 in the axial direction at the time of assembly of the wheel disk 30 and the rim 20 becomes easy due to the stepped shift portion 34a. If the step amount d1 is smaller than about 0.5 mm, the effect of the axial positioning may become small.

Though the step amount d1 may be larger than the thickness of the radially outer disk 34, it may become more difficult to press-form the wheel disk 30.

In the embodiment illustrated in FIG. 12, the shift portion 34a is stepped. A diameter of a portion of the shift portion 34a closer to the vent window 35 is smaller than a diameter of a portion of the shift portion 34a closer to the radially outer disk 34. The radially outer end 35a of the vent window 35 is located radially inside the radially outer surface of the radially outer disk 34. In some embodiments of the technology, a difference in radius (a step amount) d2 between the radially outer surface of the radially outer disk 34 and a radially outer surface of the shift portion 34a is smaller than a thickness of the radially Outer disk 34, including for example, from about 5 mm, or from about 2.5 mm to about 8 mm. In some embodiments of the technology, the step amount d2 is about 0.5 mm or larger and equal to or smaller than the thickness of the radially outer disk 34. When the step amount d2 is about 0.5 mm or larger and equal to or smaller than the thickness of the radially outer disk 34, a rigidity of the radially outer disk 34 may be high and the durability of the wheel 10 may be high. Further, since the diameter of the shift portion 34a is smaller than the diameter of the radially outer disk 34, fitting the wheel disk 30 into the rim 20 is easy when the rim 20 and the wheel disk 30 are assembled. If the step amount d2 is smaller than about 0.5 mm, the easy fitting effect due to the stepped shift portion may become small, because the fitting between the rim 20 and the wheel disk 30 is a tight fitting and the wheel disk 30 is deformed so as to decrease the step amount when the wheel disk 30 is fitted into the rim. Though the step amount d2 may be larger than the thickness of the radially outer disk 34, it may become difficult to press-form the wheel disk 30. Further, the vent window 35 may become small so that a design of the wheel may be degraded.

As illustrated in FIG. 17, the pair of spokes 33 located on opposite sides of the vent window 35 in the circumferential direction of the wheel have radially inner ends which can be connected to each other in the circumferential direction of the wheel via a connecting wall 38 which is flat or substantially flat along the circumferential direction of the wheel, at a position radially inside the vent window 35. Due to this structure, a stress caused at the connecting wall 38 may be reduced, and the durability of the disk 30 may be ensured.

When a portion of the connecting wall 38 close to the inclined portion 37 is flat, a stress caused at a boundary between the connecting wall 38 and the inclined portion 37 can be reduced, and a portion of the connecting wall 38 spaced from the inclined portion 37 need not be flat.

As illustrated in FIGS. 1 and 2, the inclined portion 37 can be a portion located radially outside the hub coupling portion 32 and can be substantially cylindrical (conic and tapered). The inclined portion 37 can connect the spoke bottom wall 33a and the hub coupling portion 32. The inclined portion 37 can extend outwardly in the radial direction of the wheel and outwardly in the axial direction of the wheel from a radially outer portion 32c of the hub coupling portion 32.

Figure 3:
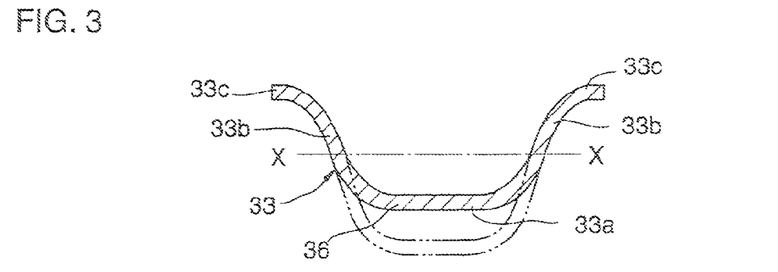
FIG. 3 is a cross-sectional view of a waved portion of a spoke of a disk of a vehicle wheel according to an embodiment of the present technology taken along a plane perpendicular to a radial direction of the wheel (taken along line I-I of FIG. 2), where a cross section of a spoke having no waved portion is also shown by a broken line for comparison with the spoke having the waved portion.

In the embodiment illustrated by a full line in FIG. 3 which is a cross section along line I-I of FIG. 2, the waved portion 36 is a portion decreased in section modulus of the spoke 33 about an axis (neutral axis) X-X perpendicular to a wheel axis and perpendicular to the wheel radial direction of the spoke 33 at a cross section taken along a plane perpendicular to the wheel radial direction at the spoke 33. The waved portion 36 can be decreased in section modulus compared with a case where no waved portion is provided (shown by a broken line in FIG. 3).

The waved portion 36 may decrease a bending rigidity of the spoke 33 about the axis X-X perpendicular to the wheel axis and perpendicular to the wheel radial direction at the spoke 33. As illustrated in FIG. 2, the waved portion 36 can be a portion of the spoke 33 which is waved (wavy).

The waved portion 36 can be provided at a portion (not an entire portion) of the spoke 33 in the wheel radial direction. The waved portion 36 can be provided for decreasing a bending rigidity of the spoke 33 about the axis X-X perpendicular to the wheel axis and perpendicular to the wheel radial direction at the spoke 33. The waved portion 36 can have its minimum section modulus due to the wavy shape radially outside a radially middle position of the spoke 33. As a result, a rigidity of the wheel 10 can be ensured.

Figure 4:
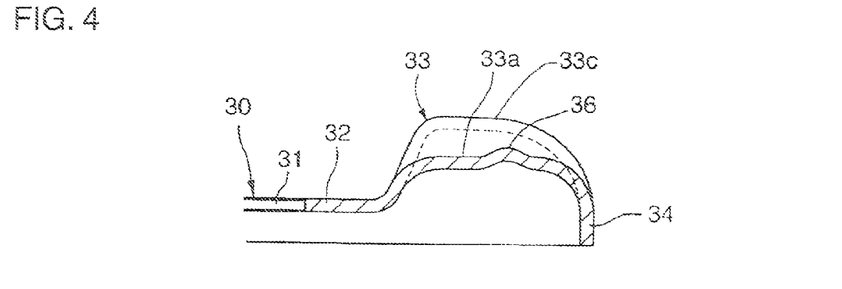
FIG. 4 is a cross-sectional view of a half portion of a disk of a vehicle wheel according to an embodiment of the present technology where a waved portion is provided at a spoke bottom wall and has one wave of one cycle.
Figure 5:
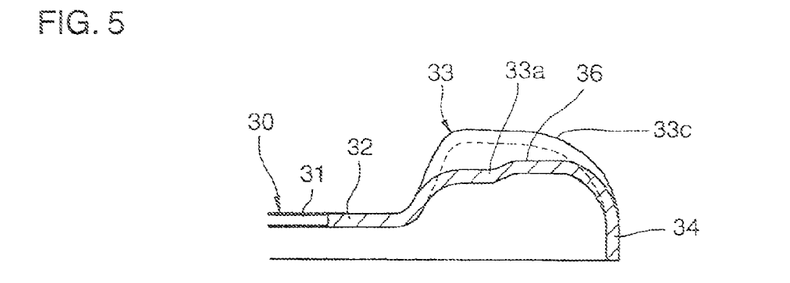
FIG. 5 is a cross-sectional view of a half portion of a disk of a vehicle wheel according to an embodiment of the present technology where a waved portion is provided at a spoke bottom wall and has one wave of a half cycle.
Figure 6:
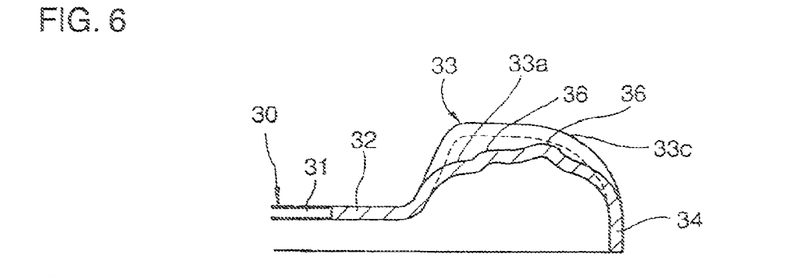
FIG. 6 is a cross-sectional view of a half portion of a disk of a vehicle wheel according to an embodiment of the present technology where a waved portion is provided at a spoke bottom wall and has two waves each constructed of a wave of one cycle.
Figure 7:
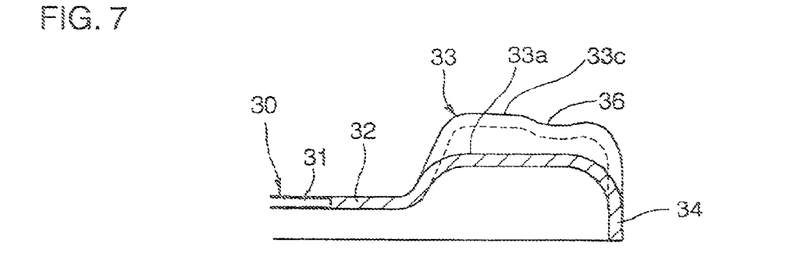
FIG. 7 is a cross-sectional view of a half portion of a disk of a vehicle wheel according to an embodiment of the present technology where a waved portion is provided at a spoke reinforcing wall and has one wave of one cycle.
Figure 8:
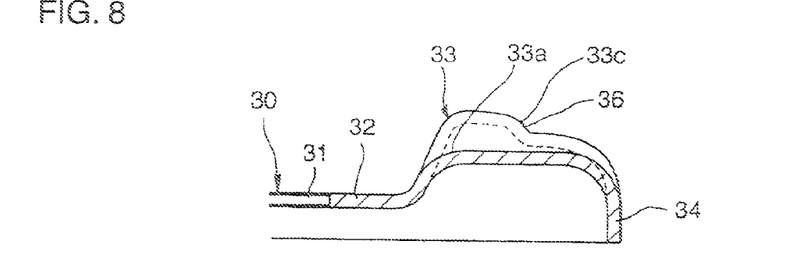
FIG. 8 is a cross-sectional view of a half portion of a disk of a vehicle wheel according to an embodiment of the present technology where a waved portion is provided at a spoke reinforcing wall and has one wave of a half cycle.

In some embodiments of the technology, as illustrated in FIGS. 4-6, the waved portion 36 may be formed by (a) outwardly displacing a radial portion of the spoke bottom wall 33a of the spoke 33 in the axial direction of the wheel (i.e., in a direction decreasing the rising amount of the pair of the spoke side walls 33b, or in a direction decreasing the wheel axial length of the spoke 33). In other embodiments of the technology, the waved portion 36 may be formed by (h) inwardly displacing a radial portion of the spoke reinforcing wall 33c of the spoke 33 in the axial direction of the wheel (i.e., in a direction decreasing the rising amount of the pair of the spoke side walls 33b, or in a direction decreasing the wheel axial length of the spoke 33), as illustrated in FIGS. 7 and 8. In other embodiments of the technology, the waved portion 36 may be formed by both (a) and (h) above, as illustrated in FIG. 9.

Due to the waved portion 36, the wheel axial length of the spoke 33 can be made smaller than that of a spoke having no waved portion.

Figure 9:
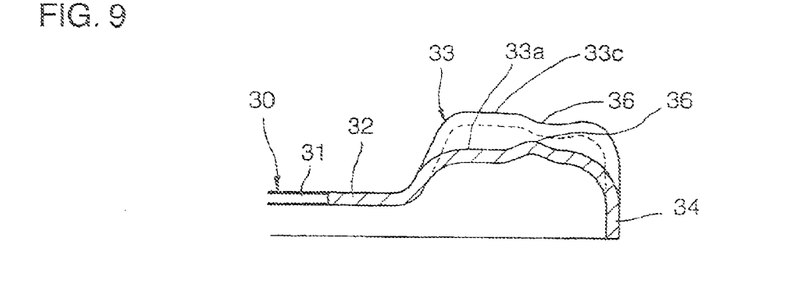
FIG. 9 is a cross-sectional view of a half portion of a disk of a vehicle wheel according to an embodiment of the present technology where a waved portion includes a first portion provided at a spoke bottom wall and having one wave of one cycle and a second portion provided at a spoke reinforcing wall and having one wave of one cycle.
Figure 10:
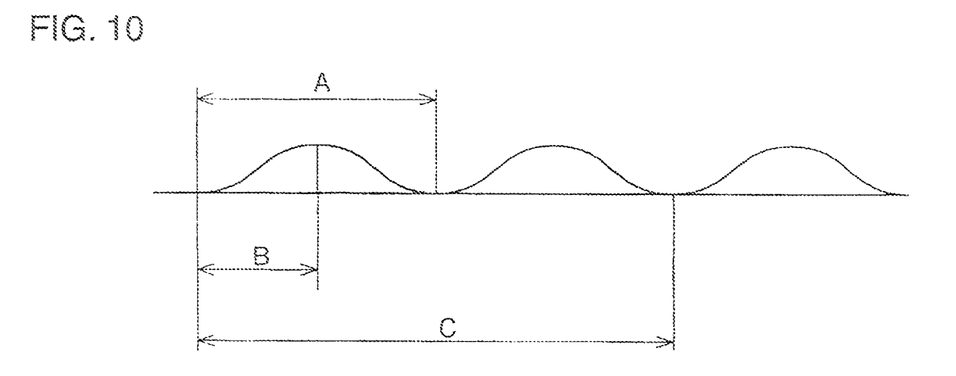
FIG. 10 is a diagram illustrating a shape of a wave.

As illustrated in FIGS. 4, 7 and 9, in some embodiments of the technology, the waved portion 36 may have one wave of one cycle A shown in FIG. 10 in a cross section of the spoke 33 taken along a plane perpendicular to the wheel circumferential direction. Alternatively, (i) as illustrated in FIGS. 5 and 8, the waved portion 36 may have one wave of a half cycle B shown in FIG. 10, or (ii) as illustrated in FIG. 6, the waved portion 36 may have a plurality of waves C shown in FIG. 10.

The waved portion 36 can be formed by a plurality of curved portions or a combination of a plurality of curved portions and straight portions in a cross section taken along a plane perpendicular to the wheel circumferential direction at the spoke 33, so that a stress concentration may be suppressed and fatigue strength may be improved.

In the embodiments shown in FIGS. 1 and 17, there is not provided a conventional rib that extends inwardly in the radial direction of the wheel from the vent window surrounding curved portion located radially inside the vent window and curved inwardly in the wheel axial direction to a position located radially inside the wheel radial position where the hub bolt holes of the hub coupling portion are provided. Therefore, the positional relationship between the spokes and the hub bolt holes and the number of the spokes and the hub bolt holes are not restricted by the conventional ribs.

In other embodiments of the technology, as illustrated in FIG. 18, the connecting wall 38 may include the radially innermost portion (i.e., rib or protrusion) extending radially more inwardly than the radially outermost portion of the radially outer portion 32c of the hub coupling portion 32, if the restriction in position and number between the spokes 33 and the huh bolt holes 32a is accepted. In the embodiment of FIG. 18, the connecting wall 38 is directly connected to the huh coupling portion 32.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A vehicle wheel including a disk press-formed from a plate, the disk comprising:
    a hub coupling portion;
    a plurality of spokes each extending outwardly in a radial direction of a wheel from the hub coupling portion;
    a vent window located between adjacent spokes; and
    a radially outer disk located at a radially outer end of the wheel and connecting radially outer ends of the adjacent spokes along a circumferential direction of the wheel,
    wherein each of the spokes includes a spoke bottom wall having a width extending along the circumferential direction of the wheel and a pair of spoke side walls rising from opposite circumferential ends of the spoke bottom wall in an axial direction of the wheel,
    wherein each of the spokes is located outside the hub coupling portion and the radially outer disk in the axial direction of the wheel,
    wherein each of the spokes includes a waved portion located at only a portion of each of the spokes in the radial direction of the wheel, the waved portion extending in a direction perpendicular to the radial direction of the wheel at each of the spokes and decreasing a bending rigidity of each of the spokes in the radial direction of the wheel by decreasing a height of each of the pair of spoke side walls in the axial direction of the wheel; and
    wherein the waved portion is formed by displacing the spoke bottom wall in the axial direction of the wheel and in a direction decreasing a height of each of the pair of spoke side walls in the axial direction of the wheel.

2. A vehicle wheel according to claim 1, wherein the waved portion extends continuously over an entire wheel-circumferential length between the pair of spoke sidewalls.

3. A vehicle wheel according to claim 1, wherein each of the spokes includes a pair of spoke reinforcing walls extending in the circumferential direction of the wheel from ends of the pair of spoke side walls opposite the spoke bottom wall, and
    wherein the waved portion is formed by displacing the spoke bottom wall in the axial direction of the wheel and in a direction decreasing an axial length of the spoke between the spoke bottom wall and spoke bottom wall-opposite ends of the spoke reinforcing walls.

4. A vehicle wheel according to claim 1, wherein the disk has a shift portion between the vent window and the radially outer disk.

5. A vehicle wheel according to claim 1, wherein the disk has a shift portion between the vent window and the radially outer disk.

6. A vehicle wheel according to claim 3, wherein the disk has a shift portion between the vent window and the radially outer disk.

7. A vehicle wheel according to claim 1, wherein a minimum bending rigidity of each of the spokes occurs in the radial direction of the wheel due to the waved portion radially outside a radially middle position of each of the spokes.

* * * * *